(12) United States Patent
Bhagavatula et al.

(10) Patent No.: US 6,778,747 B1
(45) Date of Patent: Aug. 17, 2004

(54) RADIALLY VARYING AND AZIMUTHALLY ASYMMETRIC OPTICAL WAVEGUIDE FIBER

(75) Inventors: Venkata Adiseshaiah Bhagavatula, Big Flats, NY (US); Robert Martin Hawk, Pawleys, SC (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/786,559

(22) PCT Filed: Aug. 20, 1999

(86) PCT No.: PCT/US99/18933

§ 371 (c)(1),
(2), (4) Date: Mar. 2, 2001

(87) PCT Pub. No.: WO00/14581

PCT Pub. Date: Mar. 16, 2000

Related U.S. Application Data

(60) Provisional application No. 60/099,535, filed on Sep. 9, 1998.

(51) Int. Cl.$^7$ .......................... G02B 06/02; G02B 06/18; G02B 06/22
(52) U.S. Cl. .......................... 385/123; 385/124; 385/126
(58) Field of Search ................................ 385/123–128, 385/147, 11

(56) References Cited

U.S. PATENT DOCUMENTS

| | | | |
|---|---|---|---|
| 3,811,941 A | * | 5/1974 | Morgenthaler ............... 359/280 |
| 3,823,996 A | * | 7/1974 | Kompfner et al. .......... 385/126 |
| 4,070,091 A | | 1/1978 | Taylor et al. ................. 350/96 |
| 4,395,270 A | | 7/1983 | Blankenship et al. ........ 65/3.12 |
| 4,480,897 A | | 11/1984 | Okamoto et al. .......... 350/96.3 |
| 4,515,436 A | | 5/1985 | Howard et al. .......... 350/96.33 |
| 4,529,426 A | | 7/1985 | Pleibel et al. ................. 65/3.11 |
| 4,561,871 A | | 12/1985 | Berkey .......................... 65/3.11 |
| 4,610,506 A | | 9/1986 | Tokunaga et al. ......... 350/96.33 |
| 4,630,889 A | | 12/1986 | Hicks, Jr. ................... 350/96.3 |
| 4,758,066 A | | 7/1988 | Someda ...................... 350/96.3 |
| 4,818,047 A | | 4/1989 | Takuma et al. .......... 350/96.33 |
| 4,838,916 A | | 6/1989 | Edahiro et al. ............... 65/3.11 |
| 4,896,942 A | | 1/1990 | Onstott et al. ........... 350/96.33 |
| 4,950,318 A | | 8/1990 | Dyott .......................... 65/4.21 |
| 4,978,377 A | * | 12/1990 | Brehm et al. ................. 65/403 |
| 5,149,349 A | | 9/1992 | Berkey et al. ................ 65/3.11 |

(List continued on next page.)

FOREIGN PATENT DOCUMENTS

| | | | | |
|---|---|---|---|---|
| AU | WO 89/11109 | * | 11/1989 | ............. G02B/6/16 |
| EP | 0 098 102 | | 2/1987 | ............ C03B/37/025 |
| EP | 0 810 453 | | 10/2001 | ............. G02B/6/12 |
| GB | 2 012 983 | | 1/1979 | ............. G02B/5/14 |
| GB | 0227366 A2 | * | 7/1987 | ............. G02B/6/10 |
| WO | WO 89/11109 | | 11/1989 | |
| WO | WO 99/00685 | | 1/1999 | ............. G02B/6/16 |
| WO | WO 99/64903 | | 12/1999 | ............. G02B/6/00 |
| WO | WO 00/49436 | | 8/2000 | ............. G02B/6/17 |

OTHER PUBLICATIONS

Patent Abstracts of Japan, Jan. 29, 1990, JP 20 26847, Sumitomo Electric IND LTD.

(List continued on next page.)

Primary Examiner—David V. Bruce
Assistant Examiner—Krystyna Suchecki
(74) Attorney, Agent, or Firm—Joseph M. Homa; William J. Chervenak

(57) ABSTRACT

Disclosed is a single mode waveguide fiber and a method of making a single mode or multimode waveguide fiber which has an azimuthally and radially asymmetric core. This asymmetry provides additional degrees of freedom for use in forming a waveguide having particular performance characteristics.

21 Claims, 8 Drawing Sheets

U.S. PATENT DOCUMENTS

| | | | |
|---|---|---|---|
| 5,307,436 A | 4/1994 | Berkey | 385/123 |
| 5,440,664 A | 8/1995 | Harrington et al. | 385/125 |
| 5,482,525 A | 1/1996 | Kajioka et al. | 65/398 |
| 5,570,448 A | 10/1996 | Imoto et al. | 385/126 |
| 5,712,941 A * | 1/1998 | Imoto et al. | 385/126 |
| 5,802,236 A | 9/1998 | DiGiovanni et al. | 385/127 |
| 5,907,652 A | 5/1999 | DiGiovanni et al. | 385/125 |
| 6,115,526 A * | 9/2000 | Morse | 385/125 |
| 6,151,429 A | 11/2000 | Kristensen et al. | 385/11 |
| 6,301,420 B1 | 10/2001 | Grennaway et al. | 385/126 |
| 6,334,019 B1 | 12/2001 | Birks et al. | 385/125 |
| 6,459,838 B1 | 10/2002 | Varner | 385/123 |
| 2002/0061402 A1 | 5/2002 | Christoff et al. | 428/428 |

OTHER PUBLICATIONS

Patent Abstracts of Japan, Feb. 13, 1982, JP 57 026810, Nippon Telegr & Teleph Corp.

Patent Abstracts of Japan, Feb. 23, 1985, JP 60 035702, Furukawa Denki Kogyo KK.

Patent Abstracts of Japan, Mar. 24, 1988, JP 63 065408, Fujitsu LTD.

Hasegawa, et al. "Novel hole–assisted lightguide fiber exhibiting large anomalous dispersion and low loss below I dB/km", Optical Fiber Communication Conference and Exhibit, Mar. 17–22, 2001, vol. 4, pp. PD5–1–PD5–3.

* cited by examiner

RADIALLY VARYING AND AZIMUTHALLY ASYMMETRIC OPTICAL WAVEGUIDE FIBER

This application is based upon the provisional application Ser. No. 60/099,535, filed Sep. 9, 1998, which we claim as the priority date of this application.

BACKGROUND OF THE INVENTION

The invention relates to an optical waveguide fiber and a method of making a waveguide fiber, having a refractive index profile which varies in both the radical and azimuthal directions. The additional flexibility afforded by the azimuthal variation provides for index profile designs which meet a larger number of waveguide fiber performance requirements than is possible using refractive index variation in only the radical coordinate direction.

Recent development of waveguide fibers having refractive index profiles which vary in the radial direction has shown that particular properties of the waveguide can be optimized by adjusting this profile. Varying the refractive index profile in a more general way than, for example, a simple step, allows one to select the value of one or more waveguide properties without sacrificing a base set of properties including attenuation, strength, or band resistance.

In addition, certain azimuthal asymmetric core refractive index profiles, such as those having elliptical, triangular, or square core geometry have been shown to provide useful waveguide properties such as preservation or mixing of the polarization modes.

It is expected, therefore, the core refractive index profiles which vary in both the azimuthal and radial direction will offer the opportunity to fabricate waveguides having new or improved properties for use in telecommunication, signal processing, or sensor systems.

In U.S. Pat. No. 3,909,110, Marcuse, ('110 patent) an azimuthally asymmetric core of a multimode waveguide is described. A calculation in the '110 patent indicates that periodic variations in index in both the radial and azimuthal directions would cause mode coupling, thereby increasing bandwidth, while limiting losses due to coupling to radiation modes. The concept was not extended to include single mode waveguides. Also the scope of the '110 patent is quite limited in that it refers only to sinusoidal azimuthal variations.

In describing the present azimuthally and radially asymmetric core, the concept of core sectors is introduced. A core sector is simply a portion of the core which is bounded by a locus of points of a first and a second radius which form an annular region in the waveguide. Each of the radii are different one from another and are less than or equal to the core radius. The remaining boundaries of a sector are two planes oriented at an angle with respect to each other and each containing the waveguide fiber centerline. A change in refractive index along a line within a sector means the refractive index is different between at least two points along the line.

DEFINITIONS

The following definitions are in accord with common usage in the art. A segmented core is a core which has a particular refractive index profile over a pre-selected radius segment. A particular segment has a first and a last refractive index point. The radius from the waveguide centerline to the location of this first refractive index point is the inner radius of the core region or segment. Likewise, the radius from the waveguide centerline to the location of the last refractive index point is the outer radius of the core segment.

The relative index, $\Delta$, is defined by the equation, $\Delta = (n_1^2 - n_2^2)/2n_1^2$, where $n_1$ is the maximum refractive index of the index profile segment 1, and $n_2$ is a reference refractive index which is taken to be, in this application, the minimum refractive index of the clad layer. The term $\Delta\%$, which is 100X $\Delta$, is used in the art.

The term refractive index profile or simply index profile is the relation between $\Delta\%$ or refractive index and radius over a selected portion of the core. The term $\alpha$-profile refers to a refractive index profile which follows the equation.

$n(r) = n_0(1 - \Delta[r/a]^\alpha)$ where r is core radius, $\Delta$ is defined above, a is the last point in the profile, r is chosen to be zero at the first point of the profile, and $\alpha$ is an exponent which defines the profile shape. Other index profiles include a step index, a trapezoidal index and a rounded step index, in which the rounding is typically due to dopant diffusion in regions of rapid refractive index change.

SUMMARY OF THE INVENTION

In a first aspect of the invention, a single mode waveguide has a core having at least one sector. The refractive index of at least one point within the sector is different from that of at least one point outside the sector. In the case where the sector is exactly half the core, the choice of what constitutes a point inside the sector can be chosen arbitrarily without any loss of precision of definition of the profile. The core refractive index profile changes along at least a portion of one radius to provide radial asymmetry. At a pre-selected radius the core refractive index within the sector is different from that outside the sector to provide azimuthal asymmetry.

In one embodiment, the overall core has cylindrical symmetry and thus is conveniently described in cylindrical coordinates, radius r, azimuth angle $\phi$, and centerline height z. The pre-selected radius portion, $\Delta r$ along which the refractive index changes is in the change $0 < \Delta r \leq r_0$, where $r_0$ is the core radius. The pre-selected radius at which the refractive index is different for at least two different choices of azimuth angle is within this same range.

In another embodiment the pre-selected radius portion is a segment defined as $\Delta r = r_1 - r_1$, where, $0 \leq r_1 < r_2$ and $r_2 < r_0$.

In yet another embodiment, the refractive index changes along any or all radii within a sector, in which the sector has included angle $\phi$ greater than zero but less than or equal to 180°.

In another embodiment the radius portion is in the range $0 < \Delta r \leq r_0$, and the azimuth angle $\phi$ and height z have any value provided the coordinate point (r, $\phi$, z) is in the core region.

Further embodiments of the invention include those in which the number of sectors and the angular and radial size of the sectors are specified and the functional relationship between radius r and relative index percent $\Delta\%$ is specified. Examples of the functional relationships are the $\alpha$-profile, the step and rounded step index profiles, and the trapezoidal profile.

Yet further embodiments of the invention include waveguides having a segmented core and a specified number of sectors which include areas in which glass volumes of a particular size and shape have been embedded. Three and four sector embodiments having a particular core configuration and embedded portions are described below. In some embodiments, the embedded portions themselves have a segmented refractive index configuration.

In general the embodiments of this first aspect of the invention can be either single mode or multimode waveguide fibers.

A second aspect of the invention is a method of making an azimuthally and radially asymmetric waveguide fiber. The method may be employed to make either single mode or multimode waveguide fiber.

One embodiment of the method includes the steps of modifying the shape of a draw perform and then drawing the preform into a waveguide fiber having a circular cross section. The shape of the preform is thus transferred to the cylindrically symmetric features contained within the preform, specifically the cylindrical symmetric core features. The draw preform shape may be changed by any of several methods such as etching, a sawing, drilling, or grinding.

In an embodiment of the method, the preform is altered by forming holes or surface indentations therein. Subsequent drawing of the altered preform into a waveguide fiber of circular cross section causes a circularly symmetric core to become radially or azimuthally asymmetry.

In yet another embodiment of the method, two or more core preforms are fabricated and inserted into a glass tube to form a preform assembly. The waveguide fiber resulting from drawing the preform assembly has the asymmetry of the assembly. Spacer glass particles or rods may be incorporated into the tube-core preform assembly.

DETAILED DESCRIPTION OF THE INVENTION

Figure 1A:
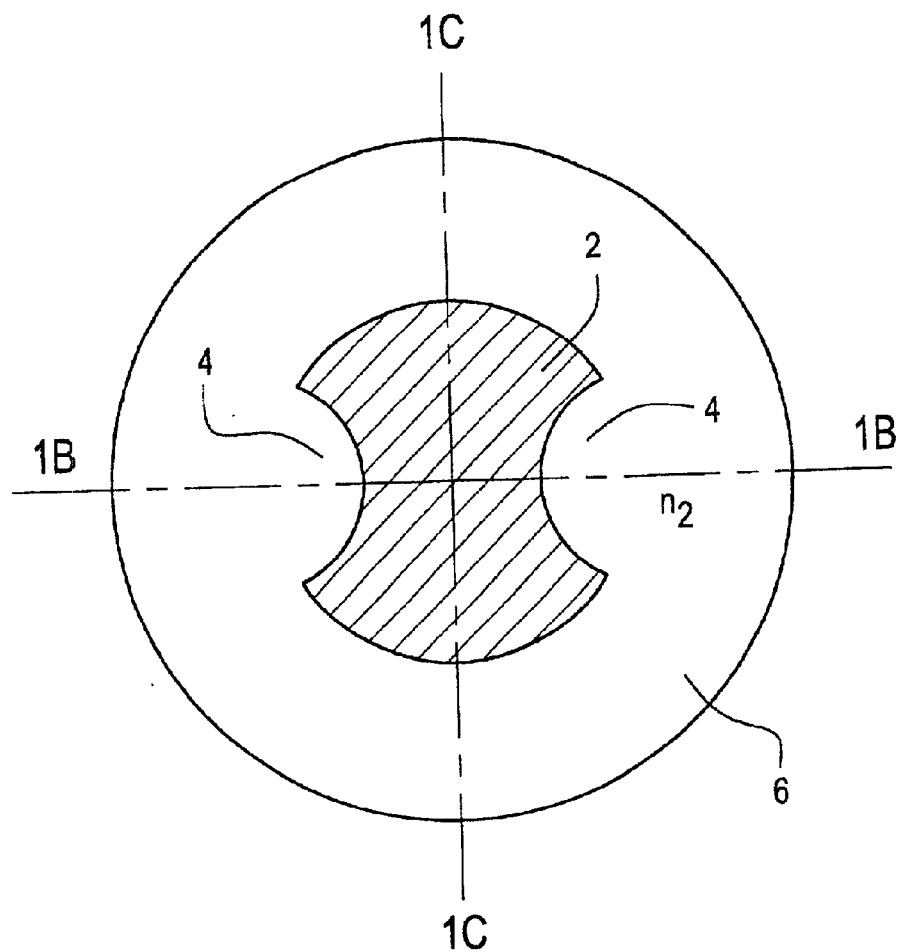
FIGS. 1a, b & c are cross sectional views of embodiments of the novel waveguide or preform having a central core design.
Figure 1B:
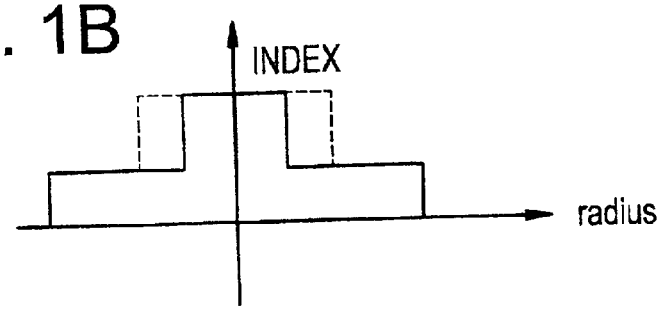
Figure 1C:
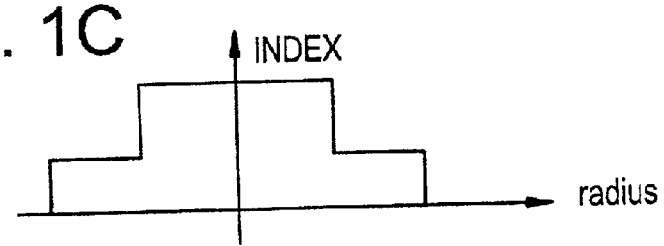

The core 2 of FIG. 1a is made azimuthally asymmetric by indentations 4. In this illustration of the novel perform or waveguide fiber, the indentation comprise the same material as that of the clad layer 6. The perpendicular sections through the core, 1B and 1C in FIGS. 1B and 1C, respectively, show the azimuthal variation in width of the step index profile. This particular profile is symmetric in the radial direction.

Figure 1D:
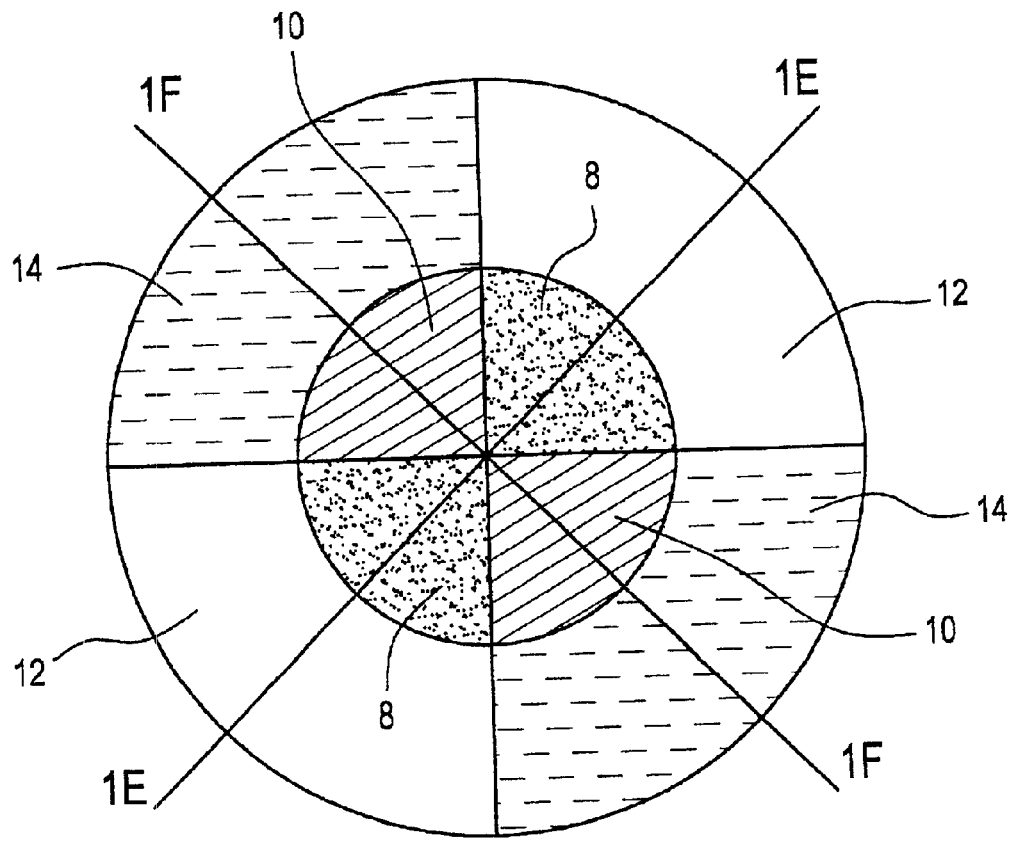
Figure 1E:
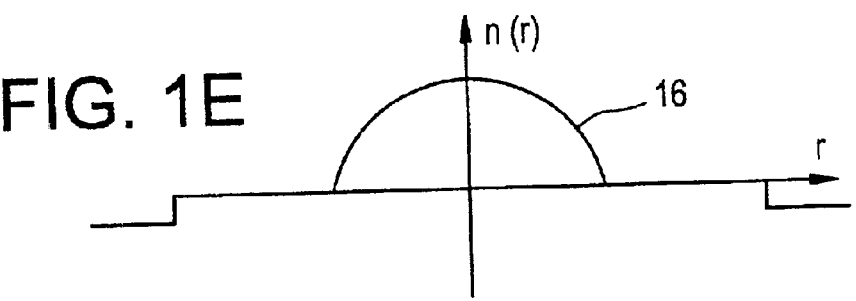
Figure 1F:
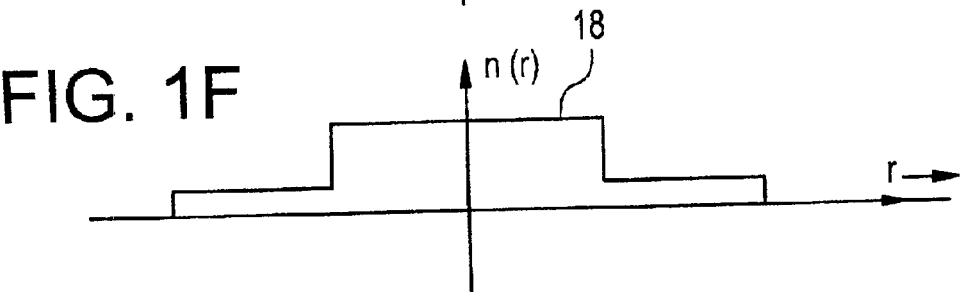

The perform or waveguide core of FIG. 1D is both radially varying and azimuthally asymmetric. In this illustration of the novel waveguide or perform, the core is divided into four sectors. Each of the two diagonally opposed sectors, 8 and 10 are mirror images of each other as is shown by the sections 1E and 1F taken through the core. The radial dependence of the 1E profile 16 can be a rounded step or an α-profile. The 1F profile 18 in FIG. 1F is a step index profile. The clad portions 12 and 14 may comprise any material having a refractive index lower than that of the adjacent core region. That is, the composition of the clad layer is generally limited only by the condition that the core clad structure guide rather than radiate light launched into the waveguide.

Figure 1G:
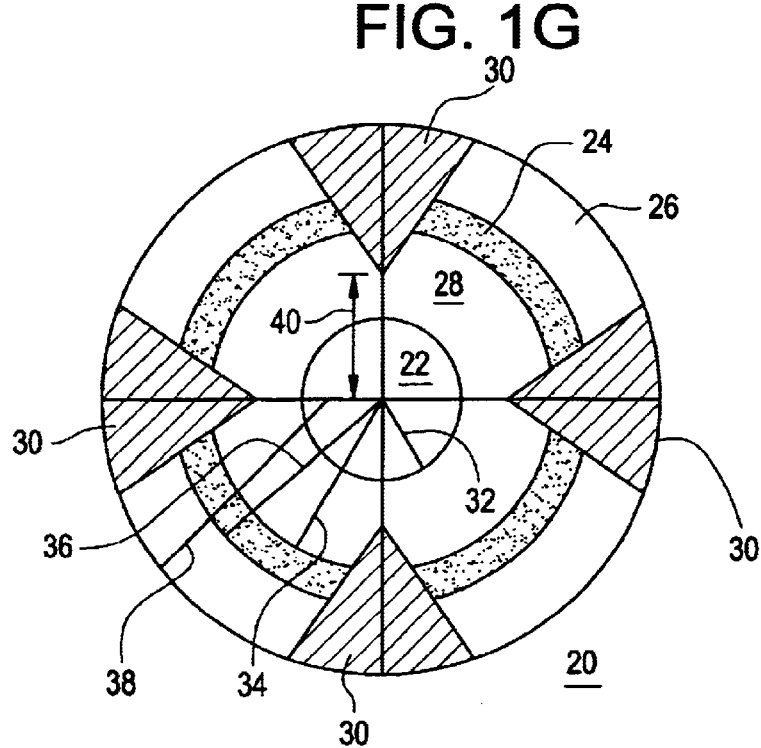

FIG. 1G is an example of a more complex structure in accord with the novel preform and waveguide. In this illustration waveguide core or core preform 20 comprises a segmented core having central region 22, and adjoining annular regions 28, 24, and 26. Each region is characterized by a respective relative refractive index Δ%, an index profile and an area determined by radii 32, 34, 36, 38 and 40. For example, central region 22 and annular region 24 may comprise respective germanium doped silica glasses and annular regions 28 and 26 may comprise silica and the relative sizes of the areas may be as shown. The asymmetry is introduced into the core preform by embedded glass volumes 30, which in general have a refractive index different from that of either annular segment 24 or 26 contacted by the glass volumes 30.

The glass volumes 30 can be formed by sawing or grinding, for example, followed by filling of the volumes with a glass by any of a number of means including deposition. The distribution of light energy carried by core 20 will be determined by the relative refractive indexes and sizes of the segments 22, 28, 24, 26, and 30. The functional properties of the waveguide are determined by the distribution of light energy across the core preform or core 20.

Figure 2A:
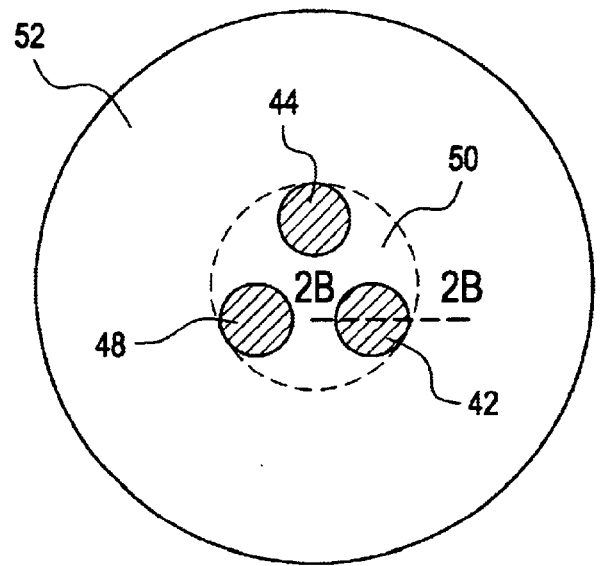
FIGS. 2a, b, c, & d are cross sectional views of the novel waveguide or preform having an embedded core design.
Figure 2B:
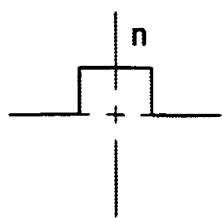

In another embodiment of the novel preform or waveguide, the core is comprised of matrix glass 50 having embedded glass volumes 42, 44, and 48 as illustrated in FIG. 2a. The glass volumes extend from end to end of the preform or the waveguide drawn from the preform. The clad glass layer 52 surrounds the core 50. The refractive index of core glass 50 is higher than that of clad layer 52. Section 2B through one of the embedded volumes shows in FIG. 2B the index profile is a step profile. The sizes of cross sectional area of the embedded glass volumes can be the same or different and a number of relative orientations relative to the clad glass layer are possible.

The structure of FIG. 2a can be made by drilling a preform, smoothing the walls of the resulting holes, and filling the holes with glass powder or rods. As an alternative, the core can be formed of rods which are then inserted into a holding tube, either with or without the use of spacer glass rods or particles. The need for a holding tube can be eliminated by welding the rods together using appropriate glass spacer material. The overclad layer can be deposited over the welded assembly of rods or can be fabricated as a tube which is shrunk onto the assembly before or during draw.

Figure 2C:
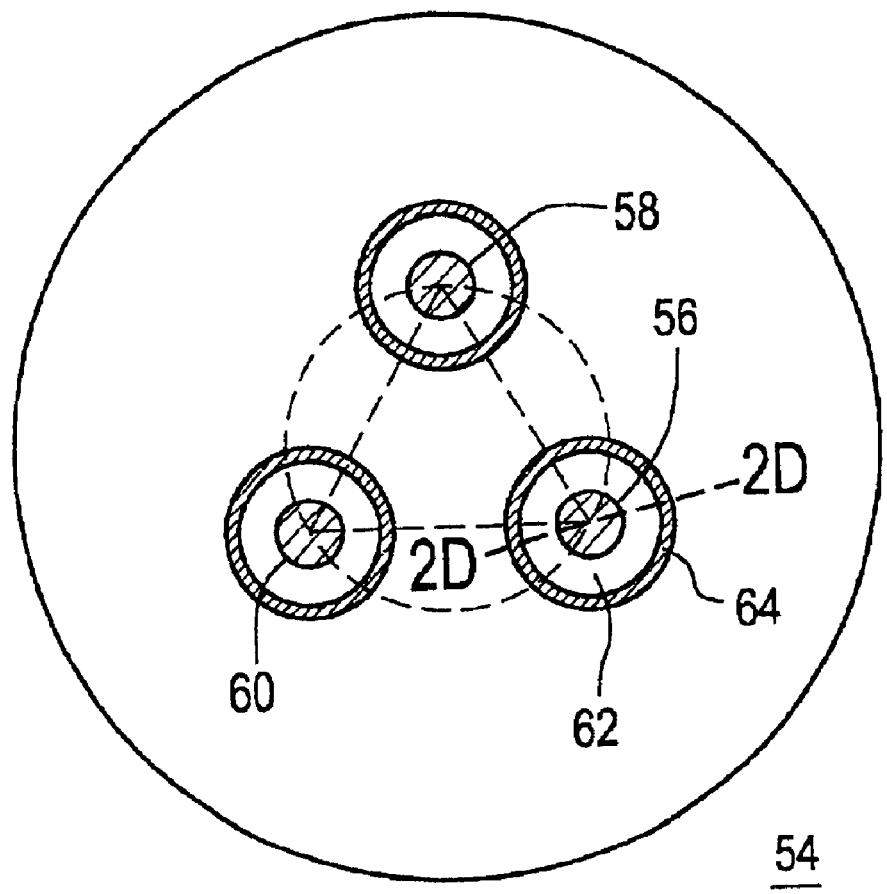
Figure 2D:
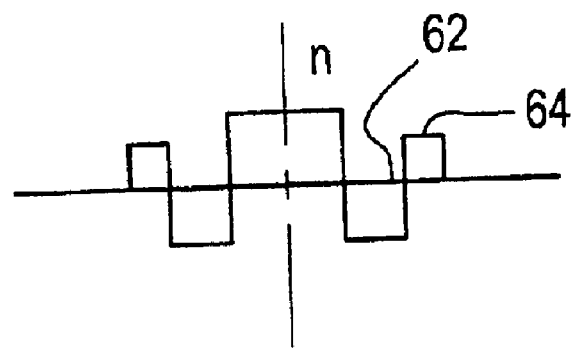

Another embodiment which includes a matrix glass and a plurality of embedded glass volumes is shown in FIG. 2C. Here the gross structure of waveguide 54 is similar to that of FIG. 2a, except that the embedded glass volumes 56, 58 and 60 each have a segmented core refractive index profile. An example of the segmented core profile is shown in the 2D cut in FIG. 2D through one of the embedded volumes in which a central region of relatively high Δ% is surrounded by two annular regions. In the illustration, the first annulus 62 is lower in Δ% than the second annulus 64. It is understood that each of the segments may have a radial dependence selected from a plurality of possibilities, such as an α-profile or a rounded step profile, and the relative Δ%'s of the segments can be adjusted to provide different waveguide functional properties.

The methods of making the preform or waveguide of FIG. 2C are essentially identical to the method of making the preform or waveguide of FIG. 2A.

Figure 2E:
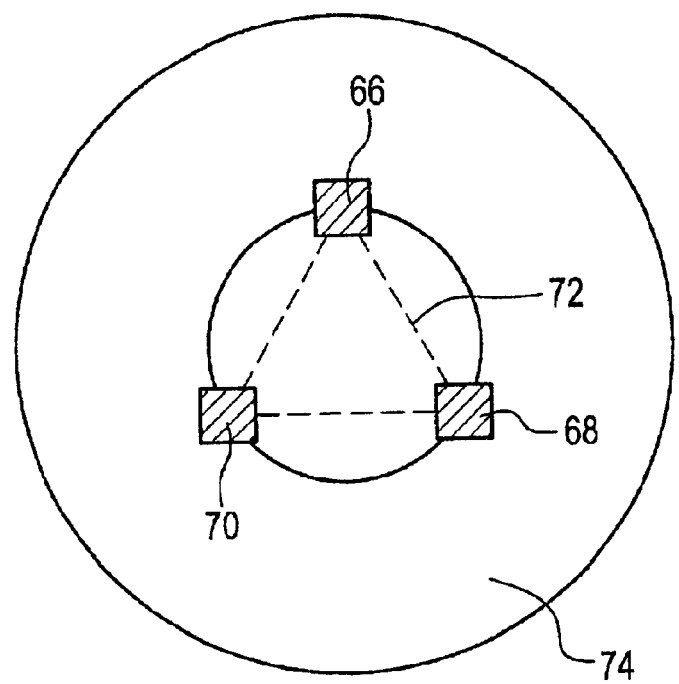
Figure 2F:
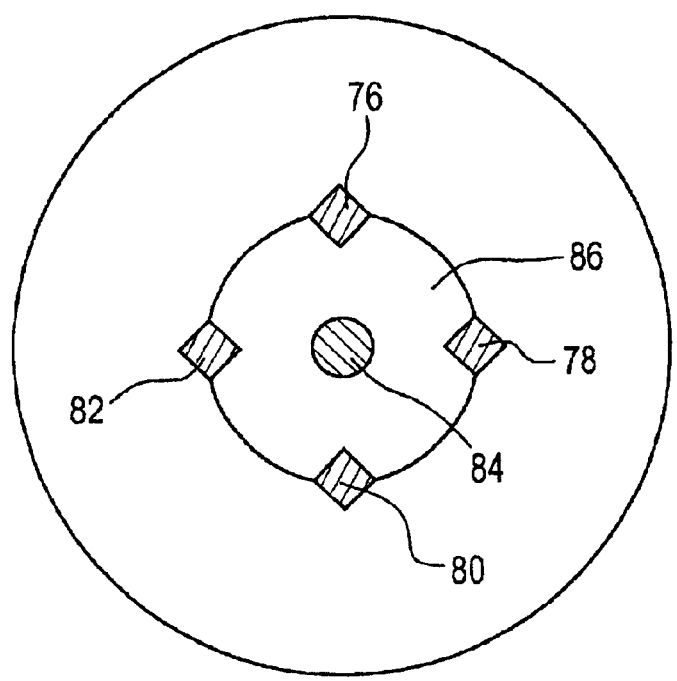

Two additional embodiments of this preform or waveguide type are illustrated in FIGS. 2E & 2F. The embedded glass volumes 66, 68, and 70 in FIG. 2E have a rectangular cross section and are arranged substantially at the apexes of an equilateral triangle. Other arrangements of the embedded glass volumes are contemplated such as arrangement along a diameter of the core region. The core region 72 can comprise a number of shapes and compositions. In the simple example illustrated in FIG. 2E, the core glass 72 is a step index profile and, as is required to guide light, has a higher refractive index than at least a portion of the clad layer 74.

In FIG. 2F a configuration comprising five embedded glass volumes is illustrated. Here, four glass volumes of diamond cross section 76, 78, 80 and 82 are symmetrically arranged about a circular central core region 84. It is evident that numerous variations of this design are possible. For example the refractive indexes of the embedded volumes 76, 78, 80, 82, and 84 can each have a different relative index as compared to that of the core region 86.

Figure 3:
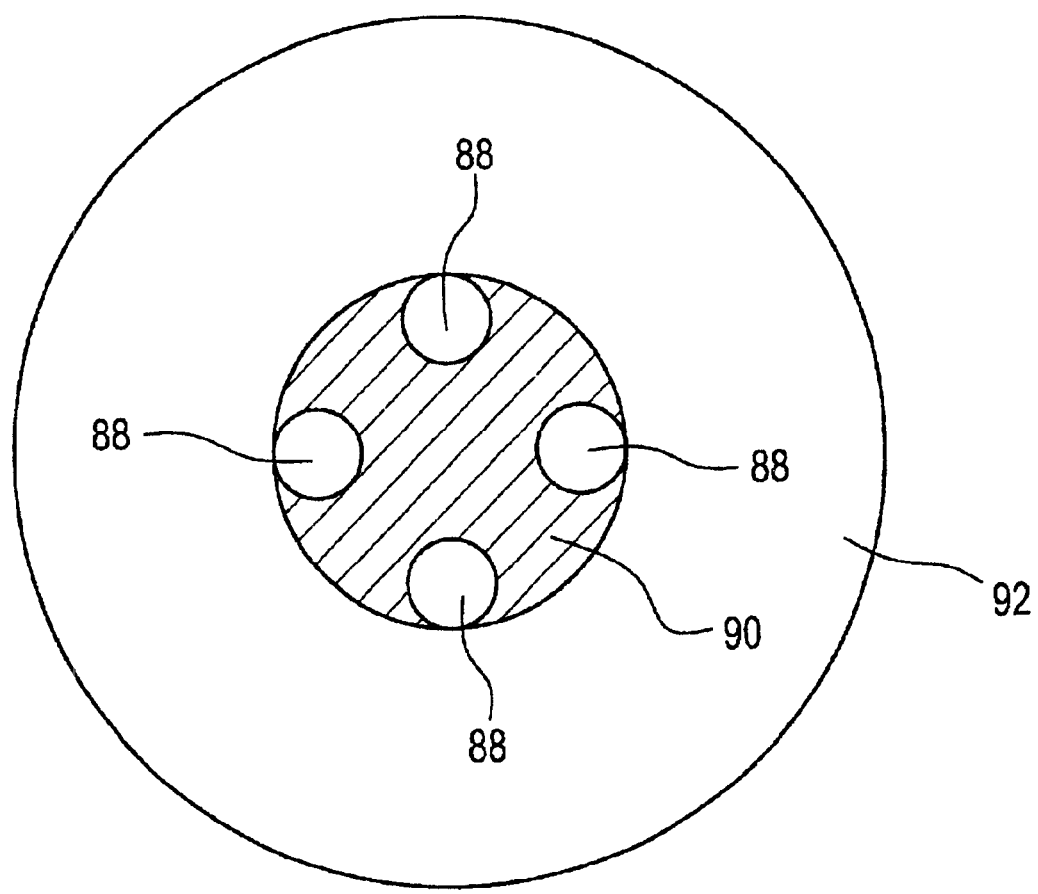
FIGS. 3 is a cross sectional view of the novel waveguide or preform containing voids.

As is shown in FIG. 3, the embedded volumes 88 in a preform or a waveguide can be voids. A waveguide having elongated voids along the long axis can be made by forming elongated voids, for example, by drilling or etching, in a core or draw preform. The index of the core glass 90 is necessarily different from that of the voids, thus providing an asymmetrical core region. In the case in which FIG. 3 represents a draw preform, the voids may be collapsed during the draw process to produce an asymmetric core. The shape of the core region after collapse of the voids is determined by the relative viscosity of core material 90 and clad layer material 92. Control of the relative viscosity of the glasses is maintained by control of temperature gradient in the portion of the preform being drawn. The relative viscosity also depends upon core and clad glass composition.

Figure 4A:
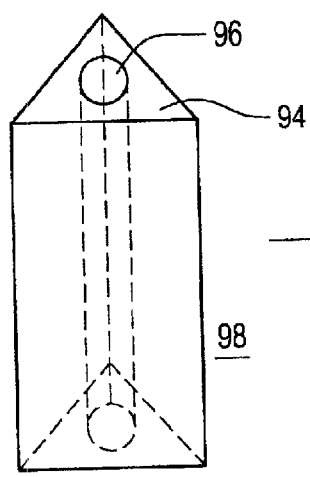
FIGS. 4a & b, and 4c & d show, in cross section, the transfer of the preform outer shape to the core after drawing.
Figure 4B:
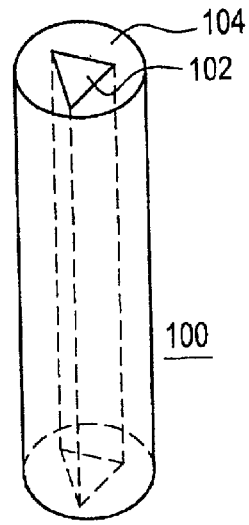

FIGS. 4a and 4b illustrative the transfer of a preform shape, 98 in FIG. 4a, from the clad layer portion 94 of the preform, to the core portion 102 in FIG. 4b of a waveguide 100 drawn from preform 98. The transfer occurs as shown in FIGS. 4a and 4b when the initial symmetry of the preform core 96 is the same as the symmetry of the waveguide clad layer 104. Cylindrical symmetry is shown because this is the symmetry most compatible with current preform fabrication and draw processes. Other symmetries are possible, for example, by partial transfer of the preform shape to the waveguide core shape, i.e., the final shape of the waveguide departs from cylindrical symmetry.

Figure 4C:
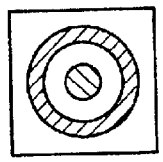
Figure 4D:
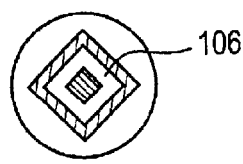

A cross section of a segmented core preform having a square shape is shown in FIG. 4c. After heating and drawing the preform into a cylindrical waveguide, the segmented core, 106 in FIG. 4d, takes on square shape due to the viscous flow of the core material which takes place to accommodate the cylindrically shaped surface of the clad layer.

Figure 5A:
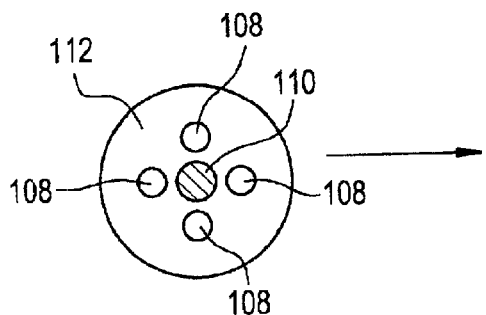
FIGS. 5a & b illustrate, in cross section, the affect on the core shape of preform voids.
Figure 5B:
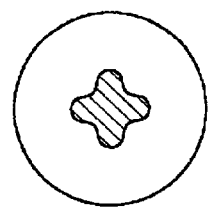

In an analogous manner, the preform of FIG. 5a, having core 110, clad layer 112 and elongated voids 108, will produce an asymmetric core when drawn into a cylindrically shaped waveguide. However, in this case the preform is cylindrical, and the movement of the core material is due to the filling of the voids during draw. As long as the preform shape is preserved as the preform is drawn into a waveguide, the core must distort, i.e., become asymmetric, to fill the voids.

EXAMPLE

A preform of the type shown in FIG. 5a was made using the outside vapor deposition process. The core region 110 was germanium doped silica and the clad layer 112 was silica. Voids 108 were formed in the preform by drilling followed by smoothing of the walls of the void using an etching solution. The preform was drawn into a waveguide fiber having the zero dispersion wavelength in the 1500 nm operation window, i.e., the waveguide was dispersion shifted. The waveguide had an unusually large mode field diameter of 10.4 μm as compared to mode field diameters in the range of 7 μm to 8 μm for dispersion shifted waveguides having an azimuthally symmetric core.

Figure 6A:
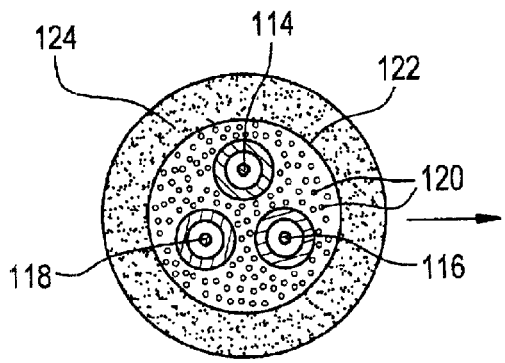
FIGS. 6a & b, and 7a & b illustrate a cross section of a preform core and tube assembly and the resulting waveguide after drawing the assembly.
Figure 6B:
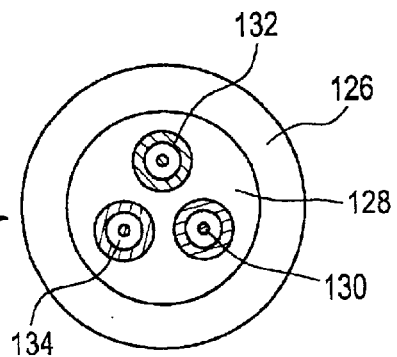

A method of making an asymmetric core is illustrated in FIGS. 6a and 6b. Segmented core preforms 114, 116 and 118 are fabricated using any of several known methods including, outside vapor deposition, axial vapor deposition, plasma deposition, or modified chemical vapor deposition. The core preforms are inserted into tube 122 where they are held in place by spacer rods 120. The rods may be made of silica, doped silica or the like. If needed, a clad layer 124 may be deposited on the tube. The preform assembly may now be drawn into a waveguide fiber having cores 130, 132, and 134 embedded in core glass 128 and surrounded by clad glass layer 126 as shown in FIG. 6b. The assembly as shown in FIG. 6a may be drawn directly. As an alternative, the deposited clad layer may be consolidated prior to draw. In addition, before clad deposition, the tube, core preform and spacer rod assembly may be heated sufficiently to soften the surfaces thereof to cause them to adhere to each other, thereby forming a more stable structure for use in the overclad or draw process.

Figure 7A:
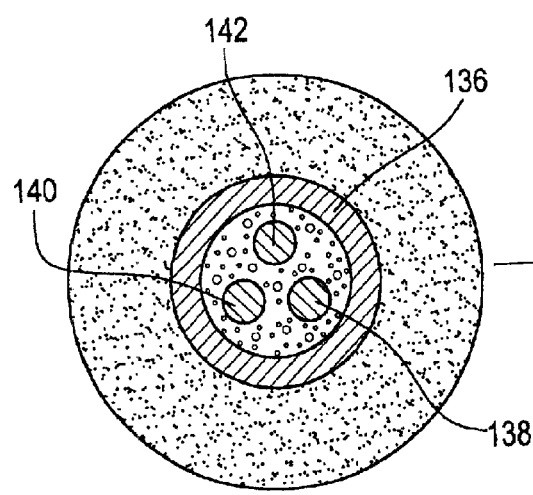
Figure 7B:
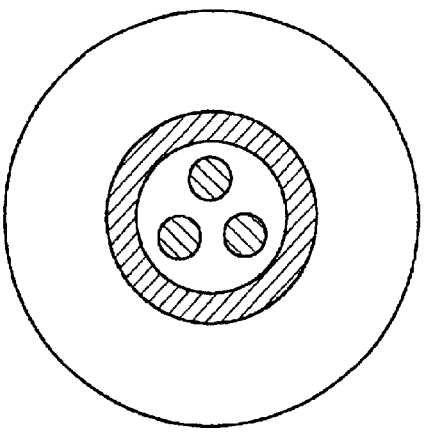

The method of making an asymmetric core shown in FIGS. 7a and 7b is closely related to that illustrated in FIGS. 6a and 6b. In FIG. 7a the core is bounded by annulus 136 which serves to better contain light propagating in step index core preforms 138, 140, and 142. As described above, spacer rods or glass powder may be used to stabilize the relative positions of the core preforms within the annulus. The assembly of core preforms, optional spacer material, annulus and overclad material may be drawn directly or first consolidated and then drawn. The resulting waveguide fiber is shown in FIG. 7b.

Figure 8A:
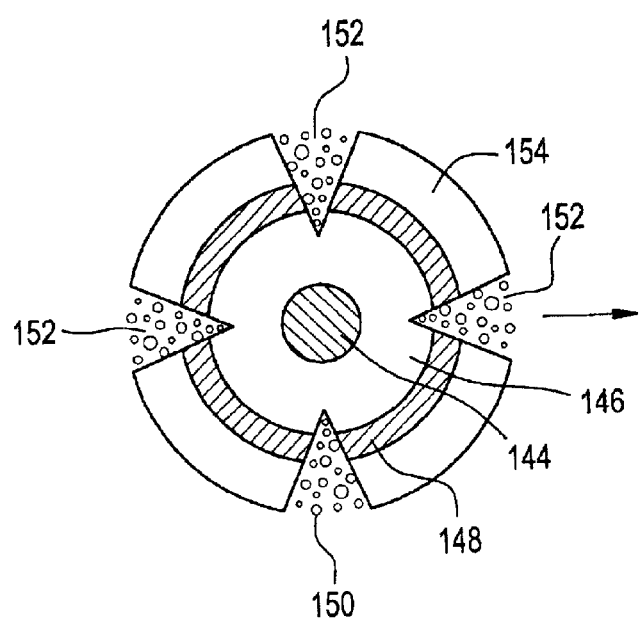
FIGS. 8a & b illustrate a cross section of a notched segmented core preform and the resulting waveguide after draw.
Figure 8B:
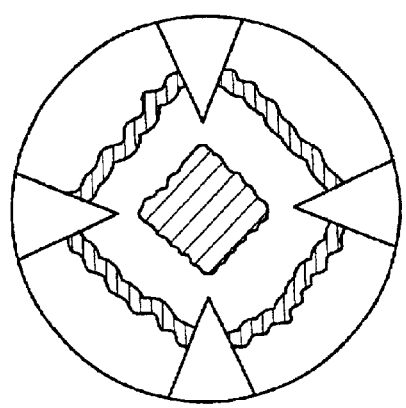

A final example of a method of forming an asymmetric core is shown in FIGS. 8a and 8b. In FIG. 8a a preform has a segmented core having central region 144, first annular region 146, and second annular region 148. The preform has been ground or sawed or the like to form notches 152. The notches may be empty or filled with material 150 which is a material different in composition from that of clad layer 154. The preform assembly is drawn to form a waveguide having an asymmetric core as shown in FIG. 8b. Here again the assembly may be drawn directly or deposition, consolidation, or tacking steps may be carried out before draw to hold the parts of the preform in proper relative registration.

Although particular embodiments of the invention have been disclosed and described herein, the invention is nonetheless limited only by the following claims.

We claimed:

1. A single mode optical waveguide fiber having a radially varying and azimuthally asymmetric core comprising:
   a core region in contact with a surrounding clad layer, at least a portion of the core region having a refractive index which is greater than the refractive index of at least a portion of the clad layer, wherein the core region has a cylindrical shape and a point in the core region has cylindrical coordinates, radius r, azimuth angle $\phi$, and centerline height z, and the radius of the core region is $r=r\_0$;
   the waveguide having a centerline parallel to the long dimension of the waveguide, and the waveguide having a plurality of core sectors, each core sector being bounded by a first and a second plane, and a segment of the core region periphery intersected by the first and the second plane, wherein the first and second planes each contain the centerline and form at the centerline an included angle $\phi \leq 108°$,
   in which, the core refractive index changes along at least a radius portion, $\Delta r$, extending perpendicular to and outward from the centerline, wherein the radius portion is in the range $0 < \Delta r < r\_0$, and
   the core refractive index at least at a point at a pre-selected radius inside each of the sectors has a value different from the core refractive index value at least at a point at the pre-selected radius outside the respective core sector, wherein the core has a first pair of opposing sectors each having a step index radial change in refractive index and a second pair of opposing sectors each having an $\alpha$-profile radial change in refractive index.

2. The single mode waveguide of claim 1, in which, the radius portion is the segment $\Delta r = r\_2 - r\_1$, where, $0 \leq r\_1 < r\_2$ and $r\_2 < r\_0$.

3. The single mode waveguide of either claim 1 or claim 2 in which the radius portion lies along any radius in at least one sector having included angle $0 < \phi \leq 180°$.

4. The single mode waveguide of claim 1, in which, the radius portion $\Delta r$ is in the range $0 < \Delta r \leq r_0$, the azimuth angle of the radius is in the range $0 \leq \phi \leq 360°$, and the radius is drawn from any point z along the centerline.

5. The single mode waveguide of claim 1, in which, the radius portion is the segment $\Delta r = r_2 - r_1$, where, $0 \leq r_1 < r_2$ and $r_2 \leq r_0$, the azimuth angle of the radius containing the segment is in the range $0 \leq \phi \leq 360°$, and the radius containing the segment is drawn from any point z along the centerline.

6. The single mode waveguide of claim 1, in which, the core has 4 sectors of equal volume numbered consecutively from 1 to 4 in a counter-clockwise azimuth direction, and the boundary planes of each sector have an included angle of 90°, and sectors 1 and 3 have the step index radial change in refractive index, and sectors 2 and 4 have the $\alpha$-profile radial change in refractive index.

7. The single mode waveguide of claim 1, in which the core has three sectors, and each sector comprises a volume of a first glass of constant refractive index embedded in a volume of a second glass constant refractive index, in which the refractive index of the first glass is greater than the refractive index of the second glass.

8. The single mode waveguide of claim 7 in which each of the first glass volumes is an elongated body having its long axis aligned parallel to the centerline, wherein the perpendicular cross section of the elongated body is selected from the group consisting of a circle, an ellipse, and a parallelogram.

9. The single mode waveguide of claim 1, in which the core has three sectors, and each sector contains an elongated glass volume having a central portion, a first annular portion surrounding and in contact with the central portion, and at least one additional annular portion in contact with the annular portion which the at least one additional annular portion surrounds, wherein the long axis of each of the elongated structures is parallel to the centerline.

10. The single mode waveguide of claim 9 in which the central portion is a cylinder having radius $r_c$ and relative index $\Delta_c$, and the annular regions are tubes having respective outer radii $r_i$ and relative index $\Delta_i$, where $i = 1 \ldots n$, and n is the number of annular portions, in which $\Delta_i$ for $i=$an even number is greater than $\Delta_i$ for i equal to an odd number.

11. The single mode waveguide of claim 1 in which the core has four sectors each sectors comprising a first glass volume having relative index $\Delta_1$, and embedded in the first glass volume of each sector is an elongated volume of a second glass having relative index $\Delta_2$, wherein the respective elongated volumes are arranged symmetrically about the centerline.

12. A multimode optical waveguide fiber having a radially varying and azimuthally asymmetric core comprising:
    a core region in contact with a surrounding clad layer, at least a portion of the core region having a refractive index which is greater than the refractive index of at least a portion of the clad layer;
    the waveguide having a centerline parallel to the long dimension of the waveguide, and the waveguide having four core sectors each bounded by a first and a second plane, and a segment of the core region periphery intersected by the first and the second plane, wherein the first and second planes each contain the centerline and form at the centerline an included angle $\phi \leq 180°$, wherein,
    the core region is of cylindrical shape and a point in the core region has cylindrical coordinates, radius r, azimuth angle $\phi$, and centerline height z, and the radius of the core region is $r = r_0$, and the refractive index changes along a radius portion $\Delta r$ in the range $0 > \underline{\Delta}r \leq r_0$, wherein,
    the four core sectors have equal volume numbered consecutively from 1 to 4 in a counter-clockwise azimuth direction, and the boundary planes of each sector having an included angle of 90°, and sectors 1 and 3 have a first radial change in refractive index, and sectors 2 and 4 have a second radial change in refractive index, wherein the first and second radial changes differ from each other.

13. The waveguide of claim 12, in which the first radial change is a step index profile and the second radial change in an $\alpha$-profile.

14. The waveguide of claim 12, in which, the four core sectors are of equal volume, the boundary planes of each sector having an included angle of 90°, the refractive index profile of each sector having a central portion of radius $r_c$ and relative index $\Delta_c$, extending between the planes bounding the sector,
    a first annular region in contact with the central portion, having outer radius $r_1$, relative index $\Delta_1$, and extending between the planes bounding the sector,
    a second annular region in contact with the first annular region, having outer radius $r_2$, relative index $\Delta_2$, and extending between the planes bounding the sector,
    a third annular region in contact with the second annular region, having outer radius $r_3$, relative index $\Delta_3$, and extending between the planes bounding the sector,
    a first volume of constant refractive index embedded in the core of the first sector and bounded on a first part of its surface by a part of the first plane bounding the sector and bounded on a second part of its surface by a part of the first, second, and third annular regions, a second volume of constant refractive index embedded in the core of the first sector and bounded on a first part of its surface by a part of the second plane bounding the sector and bounded on a second part of its surface by a part of the first, second, and third annular regions, wherein, each of the remaining three sectors contain embedded volumes having surfaces bounded in a way corresponding to the volumes embedded in the first sector, wherein the relative indexes and the radii follow the inequalities, $0 \leq r_c < r_1 < r_2 < r_3 \leq r_0$ and $\Delta_c \geq \Delta_2 > \Delta_1 \geq \Delta 3$.

15. The waveguide of claim 12 in which the four core sectors each comprise a first glass volume having relative index $\Delta_1$, and embedded in the first glass volume of each sector is an elongated volume of a second glass having relative index $\Delta_2$, wherein the respective elongated volumes are arranged symmetrically about the centerline.

16. A multimode optical waveguide fiber having a radially varying and azimuthally asymmetric core comprising:

a core region in contact with a surrounding clad layer, at least a portion of the core region having a refractive index which is greater than the refractive index of at least a portion of the clad layer;

the waveguide having a centerline parallel to the long dimension of the waveguide, and the waveguide having four core sectors each bounded by a first and a second plane, and a segment of the core region periphery intersected by the first and the second plane, wherein the first and second planes each contain the centerline and form at the centerline an included angle $\phi \leq 180°$, wherein, the core region is of cylindrical shape and a point in the core region has cylindrical coordinates, radius r, azimuth angle $\phi$, and centerline height z, and the radius of the core region is $r=r_0$, and the refractive index changes along a radius portion $\Delta r$ in the range $0 < \Delta r \leq r_0$, wherein, the core has three parts, wherein the three parts each contain an elongated glass volume having a central portion, a first annular portion surrounding and in contact with the central portion, and at least one additional annular portion in contact with the annular portion which the at least one additional annular portion surrounds, wherein each of the elongated volumes has a long axis parallel to the centerline, and each part comprises a volume of a first glass of constant refractive index embedded in a volume of a second glass of constant refractive index, in which the refractive index of the first glass is greater than the refractive index of the second glass.

17. The waveguide of claim 16 in which each of the first glass volumes is an elongated body having its long axis aligned parallel to the centerline, wherein the perpendicular cross section of the elongated body is selected from the group consisting of a circle, an ellipse, and a parallelogram.

18. The waveguide of claim 16 in which the central portion is a cylinder having radius $r_c$ and relative index $\Delta_c$, and the annular regions are tubes having respective outer radii $r_i$ and relative index $\Delta_i$, where i=1 ... n, and n is the number of annular portions, in which $\Delta_i$ for i=an even number is greater than $\Delta_i$ for i equal to an odd number.

19. A single mode optical waveguide fiber having a radially varying and azimuthally asymmetric core comprising:

a core region in contact with a surrounding clad layer, at least a portion of the core region having a refractive index which is greater than the refractive index of at least a portion of the clad layer, wherein the core region has a cylindrical shape and a point in the core region has cylindrical coordinates, radius r, azimuth angle $\phi$, and centerline height z, and the radius of the core region is $r=r\_0$;

the waveguide having a centerline parallel to the long dimension of the waveguide, and the waveguide having a plurality of core sectors, each sector being bounded by a first and a second plane, and a segment of the core region periphery intersected by the first and the second plane, wherein the first and second planes each contain the centerline and form at the centerline an included angel $\phi < 180°$, in which, the core refractive index changes along at least a radius portion, $\Delta r$, extending perpendicular to and outward from the centerline, wherein the radius portion is in the range $0 < \Delta r < r\_0$, and the core refractive index at least at a point at a pre-selected radius inside the at least one core sector has a value different from the core refractive index value at least at a point at the pre-selected radius outside the at least one core sector the refractive index profile of each sector having:

a center portion of radius $r_c$ and relative index $\Delta_c$, extending between the planes bounding the sector, a first annular region in contact with the central portion, having outer radius $r_1$, relative index $\Delta_1$, and extending between the planes bounding the sector, a second annular region in contact with the first annular region, having outer radius $r_2$, relative index $\Delta_2$, and extending between the planes bounding the sector, a third annular region in contact with the second annular region, having outer radius $r_3$, relative index $\Delta_3$, and extending between the planes bounding the sector, a first volume of constant refractive index embedded in the core of the first sector and bounded on a first part of its surface by a part of the first plane bounding the sector and bounded on a second part of its surface by a part of the first, second, and third annular regions, a second volume of constant refractive index embedded in the core of the first sector and bounded on a first part of its surface by a part of the second plane bounding the sector and bounded on a second part of its surface by a part of the first, second, and third annular regions.

20. The optical waveguide fiber of claim 19 wherein the core has sectors of equal volume, the bounding planes of each sector having an included angle of 90°.

21. The optical waveguide fiber of claim 19 wherein $0 \leq r_c < r_1 < r_2 < r_3 \leq r_0$ and $\Delta_c \geq \Delta_2 > \Delta_1 \geq \Delta_3$.

* * * * *